(12) United States Patent
Goldy

(10) Patent No.: US 10,314,438 B2
(45) Date of Patent: Jun. 11, 2019

(54) GRILLING TOOL

(71) Applicant: ASHLEY COLLECTION INC., New York, NY (US)

(72) Inventor: Robert Goldy, New York, NY (US)

(*) Notice: Subject to any disclaimer, the term of this patent is extended or adjusted under 35 U.S.C. 154(b) by 284 days.

(21) Appl. No.: 14/771,318

(22) PCT Filed: Feb. 28, 2014

(86) PCT No.: PCT/US2014/019394
§ 371 (c)(1),
(2) Date: Aug. 28, 2015

(87) PCT Pub. No.: WO2014/134434
PCT Pub. Date: Sep. 4, 2014

(65) Prior Publication Data
US 2018/0116468 A1 May 3, 2018

Related U.S. Application Data

(60) Provisional application No. 61/770,617, filed on Feb. 28, 2013.

(51) Int. Cl.
| | | |
|---|---|---|
| A47J 43/28 | (2006.01) | |
| B25F 1/04 | (2006.01) | |
| B25G 1/08 | (2006.01) | |
| B25F 1/00 | (2006.01) | |
| B25G 1/00 | (2006.01) | |
| A47J 37/07 | (2006.01) | |

(52) U.S. Cl.
CPC ......... *A47J 43/283* (2013.01); *A47J 37/0786* (2013.01); *B25F 1/00* (2013.01); *B25F 1/04* (2013.01); *B25G 1/00* (2013.01); *B25G 1/08* (2013.01)

(58) Field of Classification Search
CPC ........ A47J 43/28; A47J 43/283; A47J 43/288; A47J 37/0786; A47G 21/06; B25F 1/00; B25F 1/04; B25G 1/00; B25G 1/08
USPC ..................... 294/3, 10; 7/109, 110, 112, 113
See application file for complete search history.

(56) References Cited

U.S. PATENT DOCUMENTS 2,456,858 A * 12/1948 Bolling .................. A47G 21/06
 24/697.1
3,389,412 A * 6/1968 Emmons ................ A47G 21/06
 30/147

(Continued)

*Primary Examiner* — Dean J Kramer
(74) *Attorney, Agent, or Firm* — Dinsmore & Shohl LLP

(57) ABSTRACT

A reconfigurable tool for use in barbequing and related grilling activities. Multiple components, such as forks, knives, spatulas and tongs, may be housed in separable handle halves that can be secured to one another to define a unitary structural whole. In one form, a first handle includes numerous recesses into which one or more of the components may be foldably disposed, while a second handle terminates with a pair of tongs. The first handle may further be made up of two separable portions each pivotally cooperative with one or more of the components. In a particular form, the handles define an interlockingly cooperative relationship with one another such that together they define a substantial entirety of the tool's gripping surface. The foldable nature of the components is such that they may be retracted into the recesses formed in the first handle to give the tool a compact outer profile.

19 Claims, 4 Drawing Sheets

(56) References Cited

U.S. PATENT DOCUMENTS

| | | | | |
|---|---|---|---|---|
| 4,995,154 A * | 2/1991 | Bamber | ............... | A47G 21/06 30/147 |
| 5,327,650 A * | 7/1994 | Rojas | ................. | A47G 21/06 30/147 |
| 5,634,719 A * | 6/1997 | La Neve | ............ | G01K 1/146 116/216 |
| 6,675,483 B2 * | 1/2004 | Bond | ................. | A47G 21/02 30/142 |
| 7,008,077 B2 * | 3/2006 | Raichlen | ......... | A47J 37/0786 294/16 |
| 7,156,434 B2 * | 1/2007 | Upton | ................ | A47J 43/283 294/10 |
| 2005/0138736 A1 * | 6/2005 | Tarlow | ............... | A47G 21/06 7/110 |
| 2006/0196057 A1 * | 9/2006 | So | ...................... | A47J 43/283 30/322 |
| 2006/0244275 A1 * | 11/2006 | Bases | ................. | A47J 43/288 294/3 |
| 2012/0297548 A1 * | 11/2012 | Solari | ............... | A47J 43/283 7/113 |

* cited by examiner

GRILLING TOOL

This application claims priority to U.S. Provisional Application 61/770,617, filed Feb. 28, 2013.

BACKGROUND OF THE INVENTION

The present invention generally relates to a tool that is used specifically for grilling, barbequing and other related open-fire cooking activities.

Grilling, barbecue (BBQ) and related open-fire cooking is a popular outdoor activity. Tools allow the user to turn items on the grill to permit more even cooking. Such cooking is especially useful in cooking beef, chicken, pork, seafood and related meats, as well as for vegetables and other food items. Such tools often include forks, prongs, knives, spatulas and related implements; unfortunately, these discrete tools are configured to perform only a limited number of tasks required of a cook. Moreover, trying to handle multiple tools to rearrange, turn and otherwise to foods that are being subjected to hot fires can be difficult for the cook. Furthermore, storage, transport and cleaning difficulties are compounded when the BBQ tools are configured as numerous individual components.

What is needed is a combination tool that can be used for various BBQ functions, such as picking up and turning over meats or other foods being subjected to the heat of the grill. Such a tool would additionally be beneficial in helping remove foods from the grill once they are cooked. By integrating various functions into a single tool, ease of transport, storage and cleaning may also be achieved.

SUMMARY OF THE INVENTION

According to one aspect of the present invention, a multipurpose tool will have several different functions specifically suitable for a BBQ environment. In one particular form, there are two halves of the tool, where each half holds various discrete utensils or related components. The halves include handles that can act as a housing for at least some of the remaining components; these handles may be snapped together with slotted pins, magnets or various slidably-cooperative interlocking features such that when assembled, the two handle halves keep at least most of the BBQ utensils contained. Upon the interlocking of the two handles together, the tool attains a unitary whole construction to facilitate ease of use, handling and storage in a tool with a single, compact footprint. The ability of the tool halves to be assembled or disassembled permits these additional components to be added or removed at will, and also facilitates ease of separate cleaning. The handles—as well as the attached utensils—may be made from wash-safe materials (such as stainless steel, food-grade plastics or the like).

In one preferred embodiment, one handle has a fork, spatula and knife, while the other handle terminates in a pair of tongs. In one form, the various utensils on the first handle may be configured to be swivel-mounted (also referred to herein as pivotally-mounted or the like); in one form, this pivotal mounting may be spring-loaded, friction-loaded or the like. Additional components may also be used. Such accessories include basting brushes, cleaning brushes, other knives, thermometers, flashlights, timers, clocks or the like.

According to another aspect of the present invention, the grilling tool includes a first handle defining numerous recesses into which one or more of a spatula, fork and knife may be foldably disposed, as well as a second handle that defines tongs at one of its ends. The first and second handles define an interlockingly cooperative relationship with one another; in this way, when coupled together as an integral whole, the handles define a substantial entirety of the tool gripping surface. The foldable nature of the spatula, fork and knife is such that they may be retracted into the recesses formed in the first handle to give the tool a compact, easy-to-grasp outer profile.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
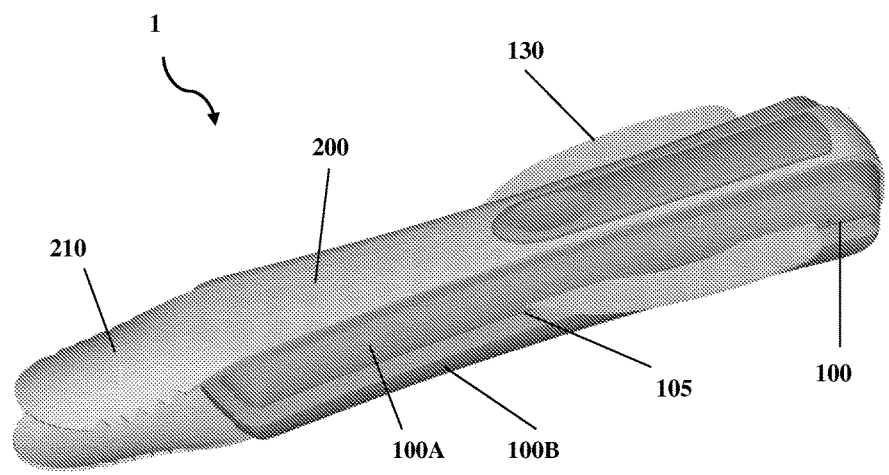
FIG. 1 shows a perspective view of an embodiment of the BBQ tool of the present invention where a pair of tongs project from the end of one of two interlockingly cooperative handle halves.
Figure 2:
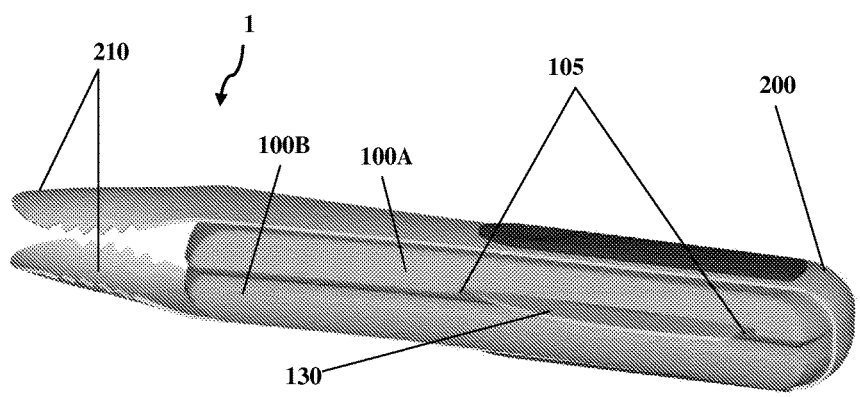
FIG. 2 shows the embodiment of FIG. 1 with the spatula removed to better show a recess formed in the first handle half, as well as the nested fit between the first and second handle halves.

Referring first to FIGS. 1 and 2, the grilling tool 1 includes two interlockable handles, including a first 100 and a second 200. When the handles 100, 200 are separated, they can be used independently, and when coupled together, they define an integral whole that makes up the majority of the outer gripping surface of tool 1. The present inventors have discovered that ease of assembly and disassembly is useful in having the tool 1 perform multiple BBQ or grilling-related functions. The use of attachable handle 100, 200 halves that each house within them one or more BBQ utensils or related implements promotes the sort of rapid reconfiguration that is consistent with this discovery. Significantly, the attachable nature of the handles 100, 200 helps to define the tool 1 in an all-in-one configuration that takes up little space yet retains the functionality traditionally associated with a set containing numerous independent grilling utensils.

The first handle 100 includes numerous of integrally connected utensils selected from the group consisting of a spatula, fork and knife, while the second handle 200 defines tongs 210 at one end. The first and second handles interlockingly cooperative with one another to define an integrated gripping surface thereby. This interlocking relationship further defines a nesting structure such that the first handle 100 makes up approximately half of the grippable portion of the tool 1, while the second handle 200 covers substantial portions of the first handle 100 to make up the remaining approximate half of the grippable portion of the tool 1.

Figure 3:
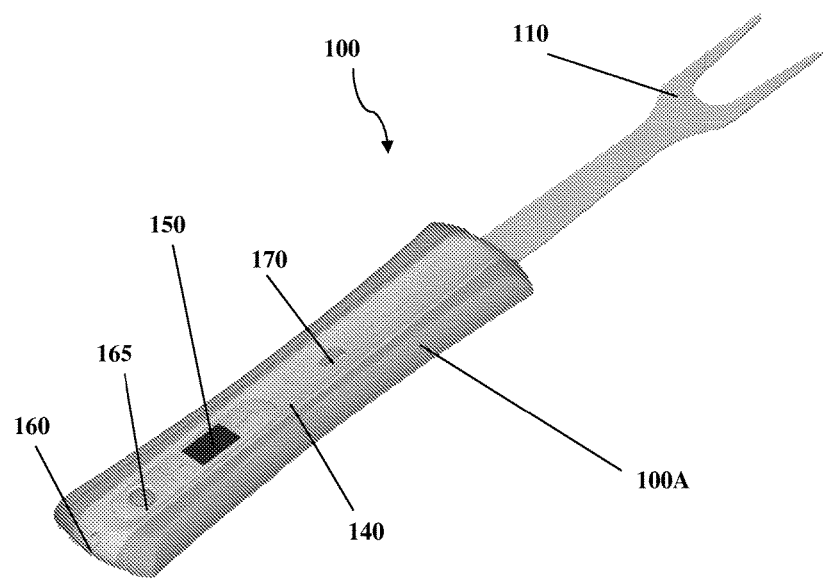
FIG. 3 shows the fork in its deployed position where it pivotally extends from one end of the first handle after having been separated from the second handle.
Figure 4:
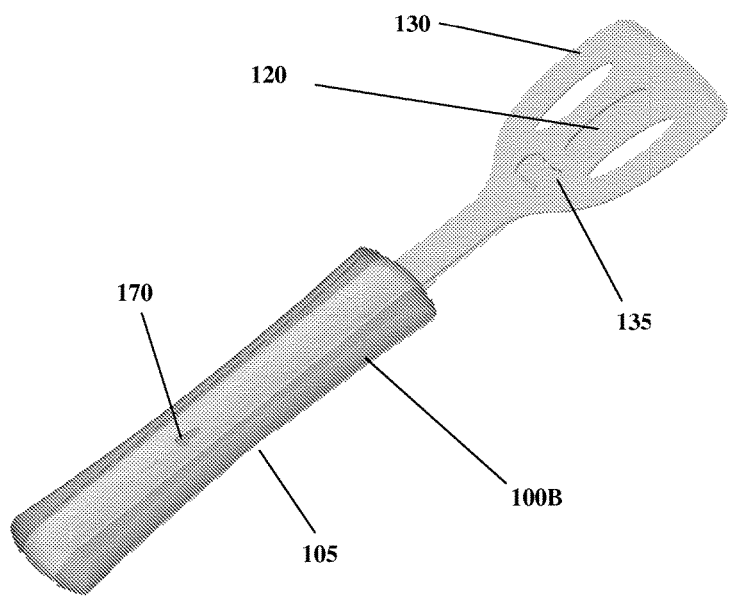
FIG. 4 shows the spatula in its deployed position where it pivotally extends from one end of the first handle after having been separated from the second handle.
Figure 5:
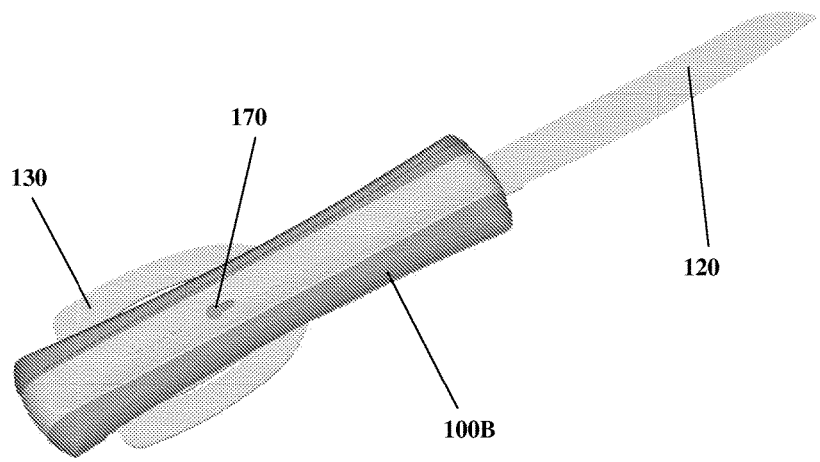
FIG. 5 shows the knife in its deployed position where it pivotally extends from one end of the first handle after having been separated from the second handle.

Referring next to FIGS. 3 through 5, the first handle 100 includes at least three rotatably-deployable utensils in the form of a fork 110, knife 120 and spatula 130, the last defining an aperture shaped to function as a bottle opener 135. The rotatable nature of their connection allows these utensils to be selectively retracted into one or more recesses 105 formed in the first handle 100 for storage or other periods where the utensils may not be needed. The pivoting relationship between the first handle 100 and at least one of the fork 110, knife 120 and spatula 130 is such that these utensils are permanently affixed to handle 100. More significantly, each of the fork 110, knife 120 and spatula 130 define a substantially planar profile; in this way, the pivoting movement of each is about an axis that is substantially orthogonal to their respective planar dimensions. In other words, the pivoting movement takes place within a plane that includes—and is defined by—the planar profile. This in turn permits storage of each within the one or more recesses 105 while maintaining a relatively small, compact outer dimension of tool 1 such that an average-sized human hand may readily and securely grasp it.

The pivoting mechanism (not shown) is formed within a housing defined as part of the handle's grippable outer surface; such mechanism is similar to a slipjoint or lockback such as those used in pocket knives, where a spine-based spring (such as a beam spring or the like) permits pawls and corresponding notches that are formed between the spring and a rotatable end portion of the fork 110, knife 120 or spatula 130 into one or the other of an open (i.e., deployed) or closed (i.e., stored) position. Thus, the present grilling tool 1 employs a pivotally mounted member that is movable into a mechanically locking engagement with a notch/pawl arrangement between one of the utensils 110, 120 or 130 and the first handle 100 to prevent movement away from this position until overcome by a user-applied force. Frictional fits between the generally planar outer surfaces of the utensils and generally planar surfaces of the recess (such as through metal spacers or the like) may further promote the intended bias, as can the spring (not shown). In this way, the tool 1 employs a spine lock to maintain the one or more utensils 110, 120 or 130 in their open position until a user-initiated force to overcome the bias is applied such that the utensils 110, 120 or 130 may be rotated back into one or more of the recesses formed within the first handle 110. The surfaces of at least the fork 110 and knife 120 may also define nail-nicks therein to facilitate ease of the pivotal movement.

Figure 7:
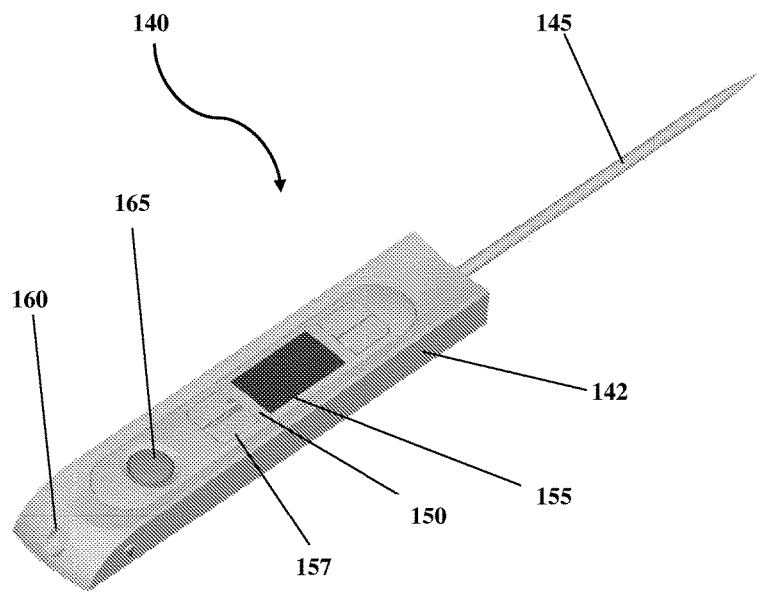
FIG. 7 shows a subassembly of the first handle that includes the thermometer, timer and flashlight.

Referring with particularity to FIG. 3 in conjunction with FIG. 7, the first handle 100 may define another recess to house a subassembly that includes a thermometer 140. A thermal probe 145 extends from one end of the thermometer 140 and cooperatively engages a complementary shaped and sized aperture in this recess to facilitate a secure mounting between the thermometer 140 and first handle 100. Close tolerances between both the probe 145 and the first handle 100, as well as between the sidewalls 142 of the subassembly and the companion sidewalls (not shown) of the first handle 100, help ensure a relatively tight friction fit between them to further enhance secure mounting. A timer 150 with a digital readout 155 may be formed in one of the surfaces of the thermometer 140 such that upon placement of the probe 145 into a piece of food, the food's internal temperature may be assessed. Control buttons 157 may be used to set or adjust the timer 150, as well as switch between display modes on digital readout 155. Likewise, a flashlight 160 may be formed into at least one end of first handle 100, and can be activated by switch 165. Although FIG. 3 (as well as FIGS. 4 and 5) shows the deployment of the respective utensil once the two handles 100, 200 have been separated from one another, it will be appreciated by those skilled in the art that the nested construction of the two handles is such that this separation is not a condition precedent to the pivoting movement of the utensils contained within first handle 100.

Figure 8:
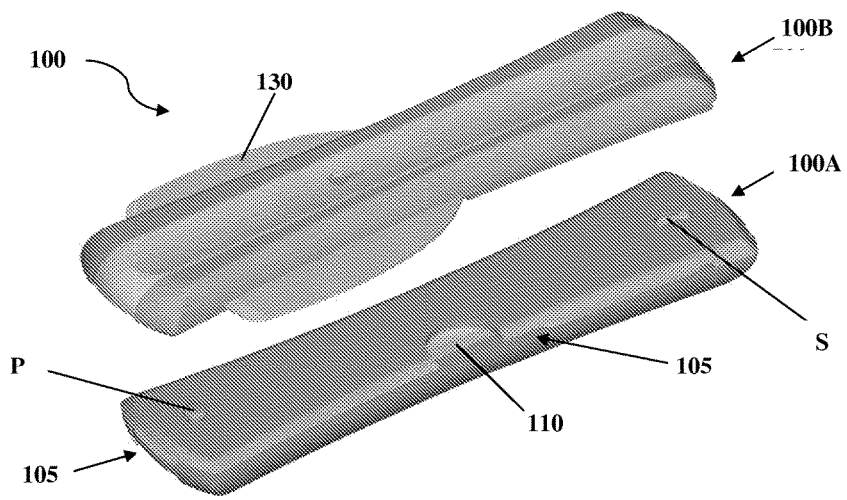
FIG. 8 shows the first handle in a disassembled state to highlight its respective first and second portions.

Referring next to FIG. 8 in conjunction with FIGS. 1 through 4, first handle 100 is shown in an exploded view to emphasize that it is further separable into two detachable portions 100A and 100B. The first portion 100A is used to house both the subassembly for the thermometer 140 as well as the fork 110 (shown in FIG. 8 in its stored state within recess 105), while the second portion 100B is used to house the knife 120 and spatula 130. Complementary-shaped pins P and slots S formed in facingly-adjacent surfaces of the first and second portions 100A, 100B is used to selectively secure them to one another to define first handle 100 as a structurally integrated whole. In another embodiment (not shown), small permanent magnets (such as samarium-cobalt or the like) may be used instead of the pins P and slots S as a way to selectively secure the two portions 100A, 100B to one another. In their separated state, the two portions 100A, 100B facilitate ease of user access to the nail nicks (not shown) that are formed adjacent the fork 110 and knife 120 edges, while in their joined state, they promote a small footprint for the first handle 100 for enhanced ease of transport and storage, especially when joined in the nested relationship with the second handle 200 as shown in FIGS. 1 and 2.

In the present context, the two portions 100A and 100B of first handle 100, as well as the second handle 200 may also be thought of as first, second and third separate handles, each configured to integrally include at least one of the aforementioned fork 110, knife 120, spatula 130 or tongs 210. Likewise, the attachable nature of these three handles ensures that when secured to one another, they form tool 1 in the manner described above. Thus, the grilling tool 1 may comprise one of the sub-handles or portions (for example, portion 100A) as a first handle that has one or more of the integrally connected utensils (i.e., the spatula 130, fork 110 and knife 120) and a second sub-handle or portion (for example, portion 100B) as a second handle that has one or more of the other integrally connected utensils from the group that are not housed, connected to or otherwise formed with the first handle. The first and second handles are interlockingly cooperative with one another (in the manner described above) to define an integrated gripping surface. While this alone may provide ample structure and functionality for tool 1, in an optional form, the tool 1 may also include a third handle with tongs at one end thereof that is sized and shaped to be cooperative with the first and second handles to define a nested relationship between them. Also as discussed above, the nested relationship between this third handle and the other two may be additionally secured via connectivity hardware, such as the aforementioned magnets, pins and slots or other interlocking mechanism.

Figure 6:
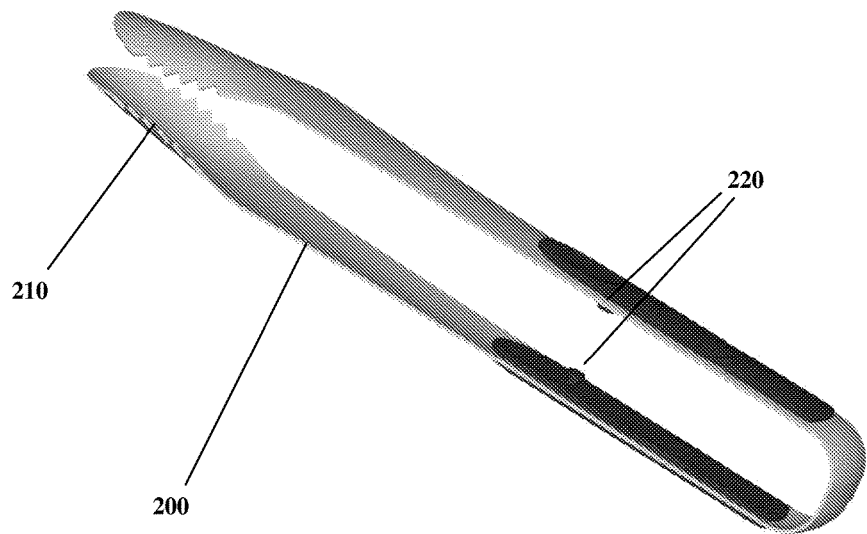
FIG. 6 shows the second handle with the pair of tongs after having been separated from the first handle.

Referring next to FIG. 6, the second handle 200 is shown removed from the first handle 100. As mentioned above, the second handle 200 terminates in a pair of tongs 210 that can be used to grip and flip food articles on the grill. In a preferred form, the backbone of the second handle 200 is made from a relatively rigid metallic structure (such as stainless steel)

such that it has a relatively high degree of structural resilience. In this way, so long as the elastic limit of the metal is not exceeded, the elongate shaft of the second handle 200 and the tongs 210 will be biased into a shape that facilitates the interlocking cooperation between the first and second handles 100, 200 into the closed tool 1 shape. In this shape, the tongs 210 and the first and second handles 100, 200 substantially encase the remainder of the utensils, as well as define the substantial majority of the tool 1 gripping surface.

Referring with particularity to FIGS. 5 and 6 together, one or more pins 220 may be formed on the inner surface of the shaft of second handle 200; these pins 220 are sized and shaped to promote interlocking connectivity between the first and second handles 100, 200 through placement into complementary-sized slot 170 formed on an outer surface of first handle 100. Slot 170 is of a generally similar construction as slot S of FIG. 8, while pin 220 is of a generally similar construction as pin P of FIG. 8. In a preferred form, the elongate dimension of slot 170 is aligned with the elongate dimension of the first handle 100 such that selective separation of the two handles 100, 200 from one another is achieved by a simple relative sliding motion between them.

The foregoing detailed description and preferred embodiments therein are being given by way of illustration and example only; additional variations in form or detail will readily suggest themselves to those skilled in the art without departing from the spirit of the invention. Accordingly, the scope of the invention should be understood to be limited only by the appended claims.

The invention claimed is:

1. A grilling tool comprising:
a first handle comprising a plurality of integrally connected utensils selected from the group consisting of a spatula, fork and knife; and
a second handle defining tongs at one end thereof, said first and second handles interlockingly cooperative with one another to define an integrated gripping surface thereby, wherein a recess formed in at least one of said first and second handles substantially houses at least a majority of each of said spatula, fork and knife while said spatula, fork and knife are in a stored position.

2. The tool of claim 1, wherein at least one of said integrally connected utensils define a pivoting relationship with said first handle.

3. The tool of claim 2, wherein said pivoting relationship facilitates (a) containment of a substantial majority of each of said utensils within a corresponding recess defined within said first handle during a utensil storage mode of operation, and (b) exposure of a substantial majority of each of said utensils outside of said corresponding recess defined within said first handle during a utensil deployment mode of operation.

4. The tool of claim 3, wherein said first handle further comprises a plurality of separable portions a first of which houses at least one of said integrally connected utensils and a second of which houses the remainder of said integrally connected utensils that are not housed in said first portion.

5. The tool of claim 1, further comprising a thermometer coupled to one of said first and second handles, said thermometer defining at least one temperature probe projecting therefrom.

6. The tool of claim 5, wherein said thermometer is detachably coupled to said first handle via friction fit therebetween.

7. The tool of claim 6, further comprising a timer coupled to one of said first and second handles.

8. The tool of claim 7, wherein said thermometer and said timer comprise a digital display.

9. The tool of claim 8, further comprising a flashlight formed into one of said first and second handles.

10. The tool of claim 9, wherein said flashlight is formed into a common detachable unit with said thermometer and said timer.

11. The tool of claim 1, wherein upon said interlocking cooperation between said first and second handles into a closed shape, said tongs and said first and second handles substantially encase the remainder of said utensils.

12. The tool of claim 11, wherein said interlocking cooperation between said first and second handles comprises a pin formed on a surface of one of said first and second handles and a complementary-sized slot formed in the other of said first and second handles.

13. The tool of claim 1, wherein said spatula defines a bottle opener formed therein.

14. A grilling tool comprising:
a first handle defining a plurality of recesses with at least one of a spatula, fork and knife foldably disposed therein, wherein said first handle further comprises a plurality of separable portions a first of which houses at least one of said foldably disposed spatula, fork and knife and a second of which houses the remainder of said foldably disposed spatula, fork and knife that are not housed in said first portion; and
a second handle defining tongs at one end thereof, said first and second handles interlockingly cooperative with one another to define an integrated gripping surface thereby.

15. The tool of claim 14, further comprising a removable thermometer formed into one of said plurality of recesses.

16. The tool of claim 15, further comprising a flashlight formed into said thermometer.

17. The tool of claim 15, further comprising a timer formed into said thermometer.

18. The tool of claim 17, wherein said timer comprises an alarm.

19. A grilling tool comprising:
a first handle comprising at least one integrally connected utensil selected from the group consisting of a spatula, fork and knife;
a second handle comprising at least one other integrally connected utensil selected from said group, said first and second handles interlockingly cooperative with one another to define an integrated gripping surface thereby; and
a third handle defining tongs at one end thereof, said third handle cooperative with said first and second handles to define a nested relationship therebetween.

* * * * *